(12) United States Patent
Rhee et al.

(10) Patent No.: US 10,358,369 B2
(45) Date of Patent: Jul. 23, 2019

(54) TREATED WATER TANK IN OIL SAND PLANT

(71) Applicant: Vitzrotech Co., Ltd., Gyeonggi-do (KR)

(72) Inventors: Byung-Ho Rhee, Gyeonggi-do (KR); Lee-Ho Hwang, Gyeonggi-do (KR); Sang-Hoon Park, Daejeon (KR); Moon-Kyu Choi, Seoul (KR); Young-Hwa Cho, Gyeonggi-do (KR)

(73) Assignee: Vitzrotech Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/710,875

(22) Filed: Sep. 21, 2017

(65) Prior Publication Data
US 2019/0039928 A1 Feb. 7, 2019

(30) Foreign Application Priority Data
Aug. 1, 2017 (KR) .................. 10-2017-0097792

(51) Int. Cl.
*C02F 1/02* (2006.01)
*C02F 1/20* (2006.01)
(Continued)

(52) U.S. Cl.
CPC .................. *C02F 9/00* (2013.01); *C02F 1/20* (2013.01); *C10G 1/002* (2013.01); *C10G 1/047* (2013.01);
(Continued)

(58) Field of Classification Search
CPC ...... C02F 1/02; C02F 1/20; C02F 1/46; C02F 1/4602; C02F 1/4608; C02F 9/00;
(Continued)

(56) References Cited

U.S. PATENT DOCUMENTS

| | | | | |
|---|---|---|---|---|
| 4,072,609 | A * | 2/1978 | Kizior | B01D 17/0214 210/294 |
| 6,347,675 | B1 * | 2/2002 | Kolle | C09K 8/38 175/205 |

FOREIGN PATENT DOCUMENTS

| | | |
|---|---|---|
| CA | 2564590 A1 | 4/2008 |
| JP | 2013071057 A | 4/2013 |

(Continued)

OTHER PUBLICATIONS

Korean Decision to Grant, KR Application No. 10-2017-0097792 dated Dec. 14, 2018.
(Continued)

*Primary Examiner* — Lucas A Stelling
(74) *Attorney, Agent, or Firm* — The Dobrusin Law Firm, PC

(57) ABSTRACT

A treated water tank in oil sand plant, comprising a first housing; an inlet provided in the first housing, through which a treated water flows in; an outlet provided in the first housing, through which the treated water stored is discharged; a second housing installed in the upper side of the first housing and communicated with the first housing by a pressure-controlling pipe; a gas discharge pipe provided in one side of the second housing for opening to the air; and a gas curtain provided in the second housing for preventing the treated water stored in the first housing from being in contact with the air. The treated water tank in oil sand plant according to the present invention simplifies the process of producing the treated water to be reused from the production water, reduces the risk of environment contamination due to the reuse of more purified treated water.

8 Claims, 4 Drawing Sheets

(51) Int. Cl.
  *C02F 5/00* (2006.01)
  *C02F 9/00* (2006.01)
  *C10G 1/00* (2006.01)
  *C10G 1/04* (2006.01)
  *E21B 21/06* (2006.01)
  *C02F 101/32* (2006.01)
  *C02F 103/10* (2006.01)

(52) U.S. Cl.
  CPC .............. *E21B 21/063* (2013.01); *C02F 1/02* (2013.01); *C02F 5/00* (2013.01); *C02F 2101/32* (2013.01); *C02F 2103/10* (2013.01); *C02F 2303/08* (2013.01); *C02F 2303/22* (2013.01)

(58) Field of Classification Search
  CPC ..... C02F 2101/32; C10G 1/002; C10G 1/047; E21B 21/06; E21B 21/063; E21B 21/065; E21B 21/067; E21B 21/068; E21B 21/34; E21B 21/40
  See application file for complete search history.

(56) References Cited

FOREIGN PATENT DOCUMENTS

| | | |
|---|---|---|
| KR | 1020170058133 A | 5/2017 |
| KR | 1020170081749 A | 7/2017 |
| KR | 2017/100200 A | 9/2017 |
| WO | 2007/047674 A2 | 4/2007 |

OTHER PUBLICATIONS

Korean Office Action, KR Application No. 10-2017-0097792 dated Oct. 26, 2018.

Yansko et al., Nitrogen: A Security Blanket for the Chemical Industry, pp. 50-55 reprinted from CEP: Nov. 2011.

European Search Report, EP Application No. 17189802.6 dated Apr. 11, 2018.

Canadian Office Action, CA Application No. 2,980,082, dated Dec. 11, 2018.

\* cited by examiner

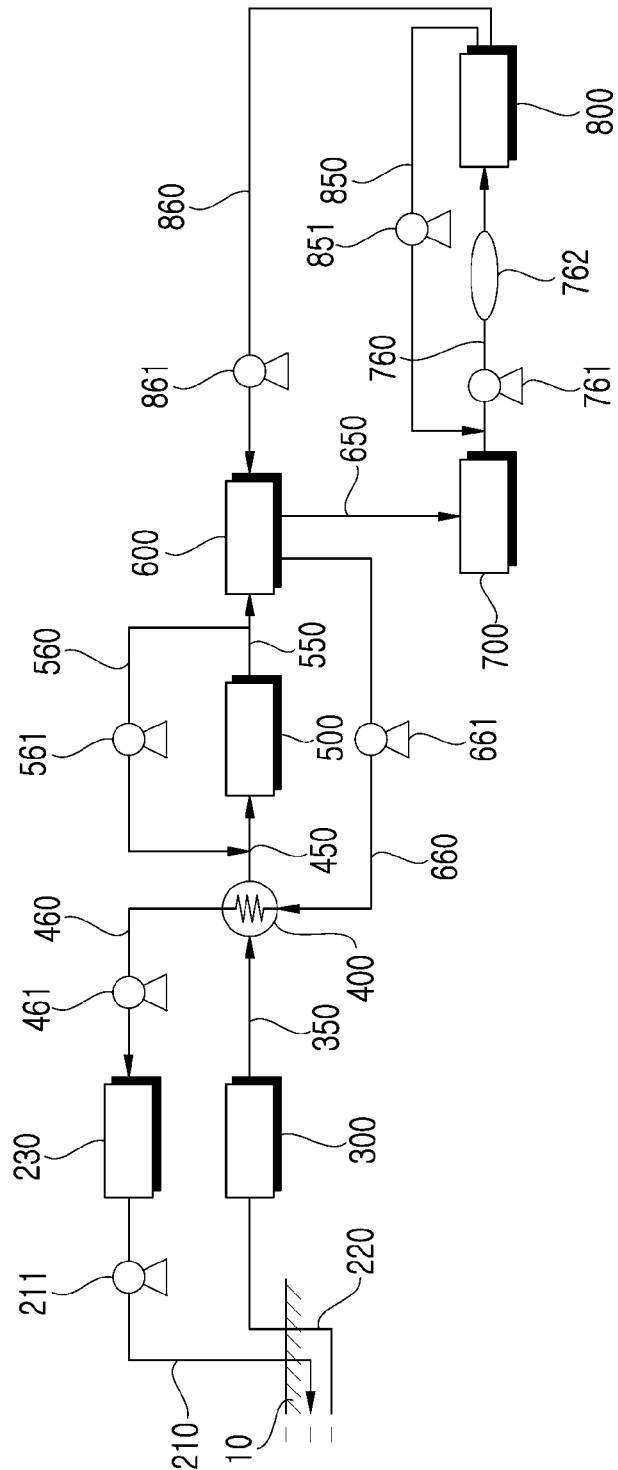

[Fig.2]
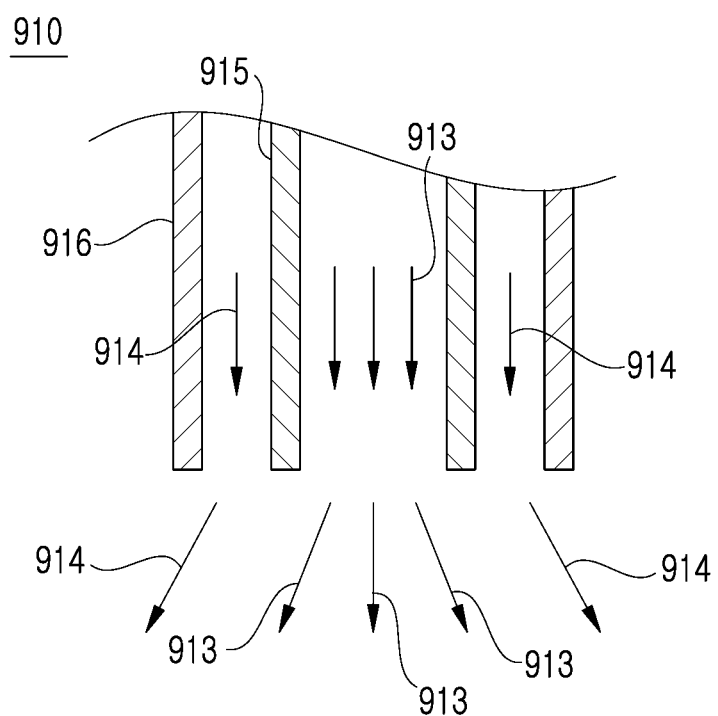

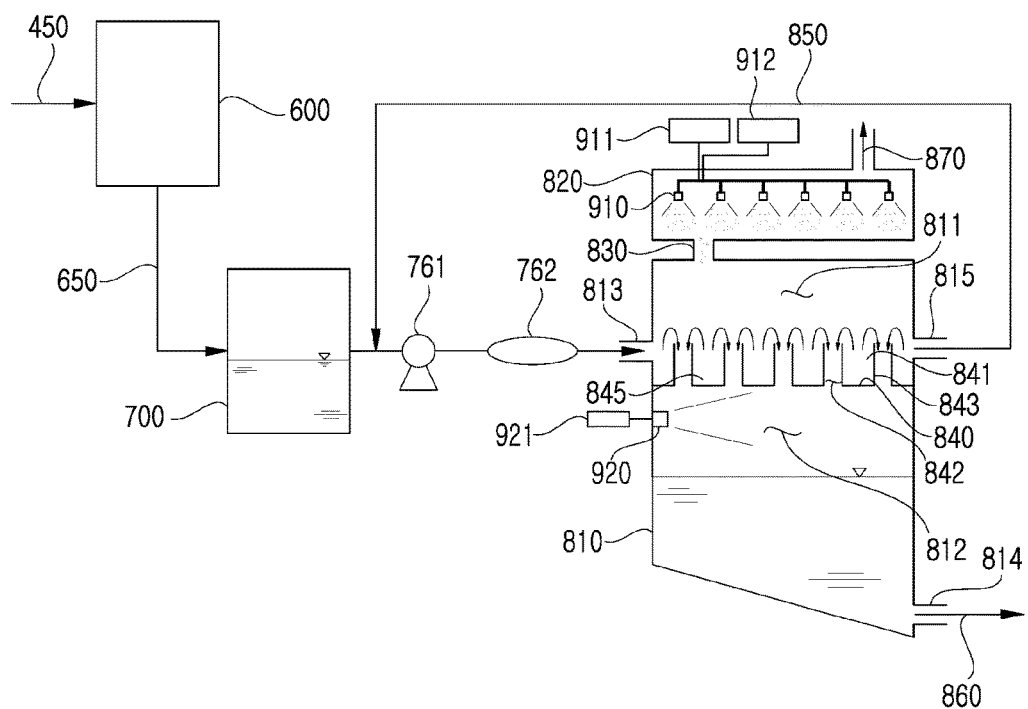
[Fig.3]

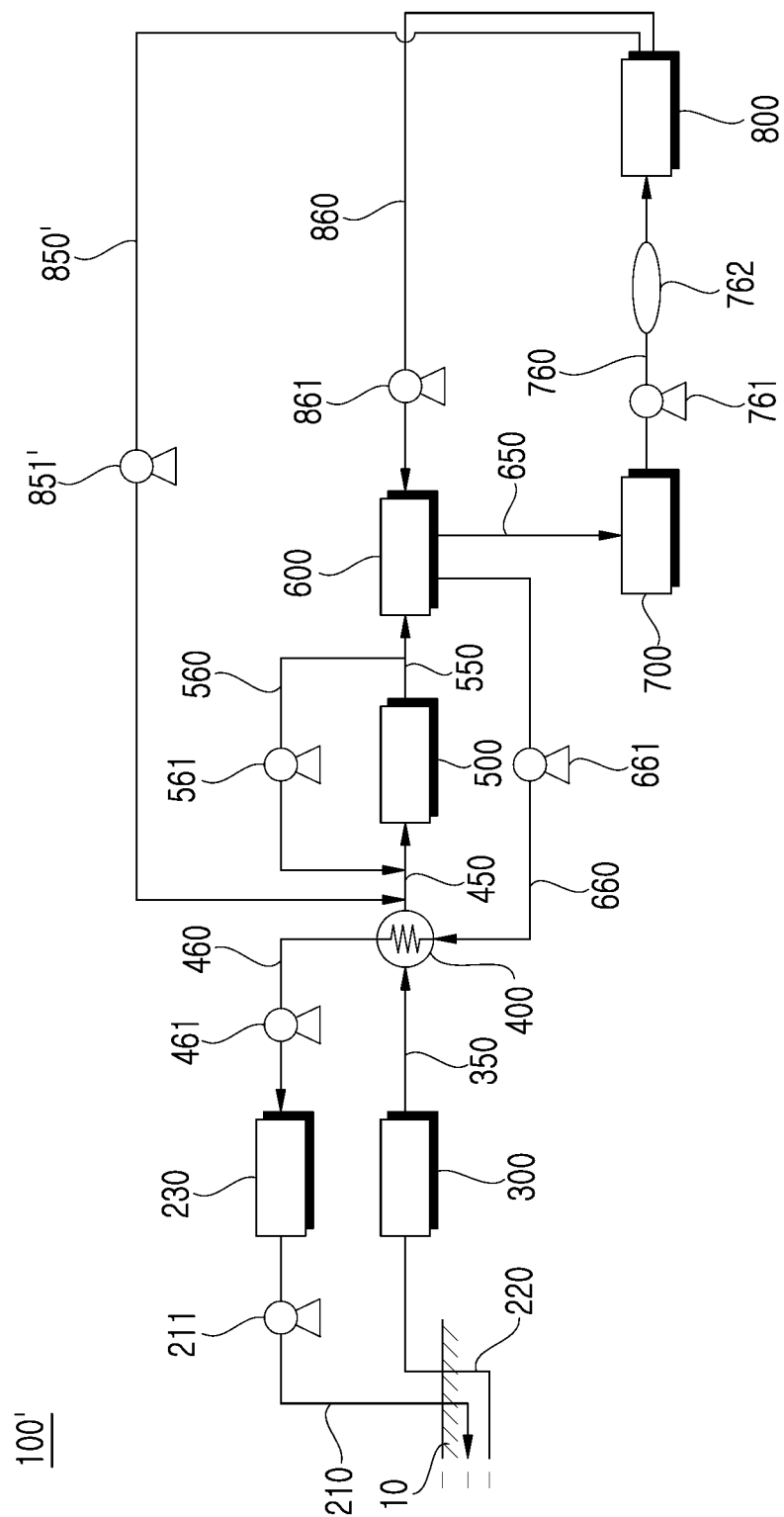
[Fig. 4]

TREATED WATER TANK IN OIL SAND PLANT

CROSS-REFERENCE TO RELATED APPLICATION

This application is based on and claims priority from Korean Patent Application No. 10-2017-0097792 filed on Aug. 1, 2017 in Korean Intellectual Property Office, the disclosure of which is incorporated by reference herein in its entirety.

TECHNICAL FIELD

The present invention relates to a treated water tank in oil sand plant, and more particularly, the treated water tank in oil sand plant which enables the treated water to be reused.

BACKGROUND OF THE INVENTION

Throughout the specification, unless explicitly described to the contrary, the descriptions of the identified items are not the conventional technologies pertaining to the claims of the present application, and the description of the identified item is not meant to be the conventional technology.

The production water takes most of waste product, i.e. of oil waste, that is produced during the oil production, and is basically the entrapped underground water which is discharged out of the earth surface. The production water discharged in producing one barrel of oil is about 7~10 barrels.

Such production water is very toxic, and contains not only ordinary oil, oil and fat, and other hydrocarbon, but large quantity of sale, metal and microelements. Accordingly, unless the production water is well controlled, it causes serious environment contamination, and the heavy cost is invested for the control of the production water.

On the other hand, the oil component extracted from oil sand called 'bitumen' is the black oil which is heavy and highly sticky, taking about 10-12% of the oil sand. The conventional crude oil is lighter than water, but since the bitumen has the specific gravity similar to that of water and thus does not flow in a borehole or oil pipeline under a natural state. A steam is applied or a superplasticizer is mixed to reduce the specific gravity and viscosity before transporting the bitumen to the oil pipeline.

The bitumen with steam applied contains a large quantity of water, which has to be got through oil-water separation process in order to collect the oil component. Since the production water generated after collecting the oil component still contains a large quantity of oil component and metal component, the production water has to be got through treatment process so that the production water contains oil component less than 5 ppm to be discharged or reused. In particular, in case of Canada where the abundant oil reserves are buried, but insufficient amount of underground water near oil sand exists, while the strict environment regulation is applied, the water intake available is limited, so the reuse of water is necessary.

However, in the conventional treatment process of production water, the foreign materials or the components contained in the air are flowed into the treated water stored during the reuse process, which thereby reduces not only the life time of pipeline, but the productivity.

SUMMARY OF THE INVENTION

Accordingly, the present invention has been made to solve the aforementioned problems occurring in the related art, and it is an object of the present invention to provide a treated water tank in oil sand plant, which simplifies the process of producing the treated water to be reused from the production water, reduces the risk of environment contamination due to the reuse of more purified treated water, and saves maintenance cost of oil plant system.

In addition, the technical problems are not limited to those described above, but are understood to make another problems drawn out of the descriptions hereinafter.

Technical Solution

To achieve the above and other objects, in accordance with an embodiment of the present invention, there is provided the treated water tank in oil sand plant, comprising a first housing; an inlet provided in the first housing, through which a treated water flows in; an outlet provided in the first housing, through which the treated water stored is discharged; a second housing installed in the upper side of the first housing and communicated with the first housing by a pressure-controlling pipe; a gas discharge pipe provided in one side of the second housing for opening to the air; and a gas curtain provided in the second housing for preventing the treated water stored in the first housing from being in contact with the air.

Advantageous Effect

According to the embodiment of the present invention having the above-described configuration, the treated water tank in oil sand plant simplifies the process of producing the treated water to be reused from the production water, reduces the risk of environment contamination due to the reuse of more purified treated water, and saves maintenance cost of oil plant system.

BRIEF DESCRIPTION OF THE DRAWINGS

The above objects, other features and advantages of the present invention will become more apparent by describing the preferred embodiments thereof with reference to the accompanying drawings, in which:

FIG. 1 is the block diagram of oil plant with the treated water tank of the present invention.

FIG. 2 is the gas discharge nozzle of the treated water tank of the present invention.

FIG. 3 is the schematic diagram of the treated water tank of the present invention.

FIG. 4 is the block diagram of oil plant with the treated water tank of the present invention according to another embodiment.

*Explanation of reference numerals for main parts in the drawing

10; oil sand layer
100, 100'; oil sand plant
210; heat supply pipe
220; digging pipe
230; boiler
300; oil separator
400; heat exchanger
500; filter
560; circulation line
600; condenser
700; temporary storage tank
800; treated water tank
810; first housing
811; first space, 812; second space
813; inlet
814; outlet
815; waste water outlet
820; second housing
830; pressure-controlling pipe
840; plate
842; penetration hole
845; plasma discharge apparatus
850; waste water line
870; gas discharge pipe
910; first injection nozzle
911; first gas tank
912; second gas tank
920; second injection nozzle
921; third gas tank

DETAILED DESCRIPTION OF THE INVENTION

Hereinafter, the present invention will be described in detail with reference to the accompanying drawings. The drawing and description are to be regarded as illustrative in nature and not restrictive, and like reference numerals designate like elements throughout the specification.

FIG. 1 is the block diagram of oil plant with the treated water tank of the present invention.

The oil plant produces the bitumen from underground oil sand. The oil sand plant (100) of the present invention collects the water used to extract the bitumen from oil sand and reuses the water.

A heat supply pipe (210) and a digging pipe (220) are buried at the underground oil sand layer (10). The heat supply pipe (210) discharges heat into the oil sand layer (10), and the bitumen with viscosity reduced by the heat is mined by a digging pipe (220).

The heat supply pipe (210) injects steam into the oil sand layer (10) to improve the liquidity of the bitumen of high viscosity and produces the production water. The digging pipe (220) collects the production water containing the bitumen. At this time, the production water contains the warm water produced as the steam is cooled, and heavy metal or sand, etc.

An oil separator (300) is installed at one end of the digging pipe (220) which is extended out of earth surface so as to communicate with the digging pipe (220). Thus, the production water containing bitumen is flowed in the oil separator (300) through the digging pipe. The oil separator (300) is, for example, a 3-phase separator which separates steam, bitumen and production water, respectively. The bitumen separated from the oil separator (300) is transported separately and can be stored while the steam contains hydrocarbon, water and some of hydrogen sulfide.

A heat exchanger (400) is installed at one side of the oil separator (300), and both oil separator (300) and heat exchanger (400) are connected to each other by a first connecting line (350). The production water separated from bitumen in the oil separator (300) is flowed in the heat exchanger (400) through the first connecting line (350). At this time, the treated water stored in a treated water tank that will be described afterwards, is flowed into the heat exchanger (400) through a first and second supply lines (860, 660). The production water flowed into the heat exchanger (400) is cooled down to below 100 degree in Celsius, i.e. 40~90 degree by the heat exchange with the treated water. The production water passing the heat exchanger (400) contains some of oil component (for example, 1000~3000 mg/l) which has not been yet separated in the oil separator (300).

A filter (500) is provided at one side of the heat exchanger (400). The filter (500) filters the production water and removes the oil component contained in the production water. The filter (500) is connected to the heat exchanger (400) and the second connecting line (450), respectively communicated with each other. The production water cooled down thru the heat exchanger (400) is flowed in the filter thru the second connecting line (450). The vapor filtered in the filter (500) is discharged out thru the third connecting line (550). As the filter (500) uses membrane member, it is desirable to keep the outside of the membrane member under negative pressure, so, for example, a vacuum pump (not shown) for a pressure reduction apparatus is provided at one side of the third connecting line (550).

The production water not filtered in the filter (500) can be guided to the filter (500) along a circulation line (560) by operating a first pump (561), and the membrane vaporization can be executed in multiple stages by connecting a plurality of filters (500) in series.

A condenser (600) is installed at one side of the filter (500), and a membrane vaporizing apparatus (500) and the condenser (600) are installed to communicate with each other by the third connecting line (550). The condenser (600) condenses the vapors penetrated thru the filter (500), and thus the treated water is produced.

The condenser (600) is communicated with the treated water tank (800) by the first supply line (860). That is, the treated water stored in the treated water tank (800) is supplied along the first supply line (860) into the condenser (600). At this time, the vapor flowed into the condenser (600) is cooled by the treated water delivered thru the first supply line (860), and condensed into the treated water, which is then flowed into a temporary storage tank (700) along the fourth connecting line (650).

On the other hand, the treated water fed to the condenser (600) along the first supply line (860) is heat exchanging with the water vapor, and then flowed into the heat exchanger (400) along the second supply line (660) by operating the second pump (661). At this time, as described above, the production water separated from the bitumen as it passes the oil separator (300) is cooled down by heat exchange with the treated water that is flowed into the heat exchanger (400).

The treated water boiled by heat exchange with the production water as it passes thru heat exchanger (400) is flowed into a boiler (230) along the third supply line (460) by operating the third pump (461), and is heated up to the steam state, which flows along the heat supply pipe (210) by operating the fourth pump (211) and then is discharged into the oil sand layer.

At this time, the treated water fed to the boiler (230) from the treated water tank (800) is heated up due to heat exchange as the water passes thru the boiler (600) and the heat exchanger (400). Accordingly, the heat energy necessary for generating steam in the boiler (230) is saved.

The temporary storage tank (700) is installed at one side of the condenser (600), and both the condenser (600) and the temporary storage tank (700) are communicated by the fourth connecting line (650).

The treated water tank (800) is installed at one side of the temporary storage tank (700). Both the temporary storage tank (700) and the treated water tank (800) are communicated with each other by a discharge line (760). The treated water stored in the discharge line (760) is flowed into the treated water tank (800) along the discharge line (760). The water treatment filer (762) is provided in the discharge line (760). A discharge pump (761) is provided to discharge the treated water stored in the temporary storage tank (700) thru the discharge line (760) of the temporary storage tank (700).

When the treated water is discharge from the temporary storage tank (700) by operating the discharge pump (761), the condensed water stored in the condenser (600) is carried to the temporary storage tank (700) along the fourth connecting line (650) as the internal pressure of the temporary storage tank (700) is reduced.

If the treated water stored in the treated water tank (800) get in contact with the air, sulfur or carbon dioxide component, etc. contained in the air are melt in, which may curtail the life time due to corrosion or precipitation in the pipes where the treated water passes through.

In order to prevent it, the treated water tank may be sealed completely, or separate apparatuses such as ion extractor may need to be provided to remove the specific components in the air. If the treated water tank (800) is sealed completely, the normal flow of the treated water may not occur due to the pressure change accompanied by the change in internal temperature, or even reverse flow may occur.

In order to solve the problems described above, the treated water tank (800) is opened to the air so that the treated water is readily fed towards the boiler (230) for the reuse of the treated water stored, which forms the atmospheric pressure inside. And, the direct contact with the air is prevented by generating a gas curtain at the upper side of the treated water stored.

The treated water tank (800) is provided with a first housing (810) having an inlet to which the treated water flows in, and an outlet through which the treated water stored is discharged. At the upper side of the first housing (810) is installed a second housing (820). The second housing (820) has space inside where the gas curtain is formed by the gas supply.

The first housing (810) and the second housing (820) are communicated by a pressure-controlling pipe (830). In the inside of the first housing (810), the atmospheric pressure is maintained by the pressure-controlling pipe (830).

At the upper side of the second housing (820) is provided with a gas discharge pipe (870) which is preferably formed to be able to communicate with the air at one upper side of the second housing (820).

In the inside of the second housing (829) is included a first injection nozzle (910) which generates gas curtain by injecting the gas. More than one first injection nozzles (910) are arranged in the upper side of the second housing (820). At one side of the second housing (820) is provided with a gas tank (911, 912) for supplying the gas to the first injection nozzle (910).

Describing more specifically the first injection nozzle (920) with reference to FIG. 2, the first injection nozzle (910) comprises a first injection block (915) which injects a first gas (913), and a second injection block (916) which is formed around the first injection block (915) and injects a second gas (914) to the outside of the injection plane of the first gas (913).

The first gas (913) is stored in the first gas tank (911) and injected thru the first injection block (915) communicating with the first gas tank (911), while the second gas is stored in the second gas tank (912) and injected thru the second injection block (916) communicating with the second gas tank (912).

The nozzle of the first injection block (915) has wider area than that of the second injection block (916). Thus, although the first injection block (915) injects more amount of the first gas (913), the second injection block (916) injects small amount of the second gas (914) faster to form the curtain covering the upper part of the first gas (913).

The first gas (913) and the second gas (194) are not necessarily different kinds of gases from each other, and not the noble gases as long as both gases do not generate corrosion or precipitation in the pipe. However, it is preferable to select argon (Ar) gas for both the first gas (913) and the second gas (914).

Referring to FIG. 3 to describe the treated water tank (800) more specifically, the inside of the first housing (810) is sectioned into upper space (a first space (811)) and lower space (a second space (812)) by a plate (840). The inlet (813) to which the treated water is flowed is formed in the first space (811), and the outlet (814) from which the treated water stored is discharged is formed in the second space (812).

The plate (840) has a plurality of the penetration holes (842). A barrier (843) is protruded to a prescribed height around the penetration hole (842).

The barrier (843) forms a pooling space (841) which pools the treated water at the first space (811) in the upper side of the plate (840) until the treated water flows in to the prescribed height.

If the treated water flowing into the first space (811) exceeds a certain amount, the treated water passes over the barrier (843), goes through the penetration hole (842) and flows into the second space (812). As described above, the treated water is purified one more time as the same is pooled in the pooling space (841) and overflowed.

The plate (840) is provided with a plasma discharge apparatus (845). The plasma discharge apparatus (845) is preferably provided in the bottom plane of the plate (840). The plasma discharge apparatus (845) decomposes non-degradable matters electrically, and precipitates metal components contained in the treated water. Hereinafter, the treated water which does not pass the penetration hole (842) and contains the precipitates is called waste water.

The waste water is discharged through a waste water outlet (815) which is provided at the lower position than the height of the barrier (843), and flows out of the first housing (810). The waste water outlet (815) is again fed along a waste water treatment line (850) to the water treatment filter (762). The waste water outlet (815) can be also fed to the filter (500) as illustrated in FIG. 4 according to another example (100').

On the other hand, in order to prevent the treated water stored in the second space (812) from being in contact with the air, a second injection nozzle (920) may be provided to form the gas curtain in the second space (812) of the first housing (810). The second injection nozzle (920) is communicated with a third gas tank (921).

What is claimed is:

1. A treated water tank in oil sand plant, comprising
a first housing;
an inlet provided in the first housing, through which a treated water flows in;
an outlet provided in the first housing, through which the treated water stored is discharged;
a second housing installed on the upper side of the first housing and communicated with the first housing by a pipe for controlling pressure;
a gas discharge pipe provided in one side of the second housing for opening to the air; and a gas curtain provided in the second housing for preventing the treated water stored in the first housing from being in contact with the air, a first space and a second space that are sectioned upper and lower in the inside of the first housing;

a plate with a plurality of penetration holes provided between the first space and the second space; and a barrier protruded to a prescribed height around the plurality of penetration holes of the plate so that the treated water flowing into the first housing is pooled at a first space in the upper side of the plate, wherein an inlet of the first housing is formed in the first space, and an outlet of the first housing is formed in the second space, wherein if the treated water flowing into the first space exceeds a certain amount, the treated water passes over the barrier and flows into the second space.

2. The treated water tank in oil sand plant of claim 1, wherein the second housing further comprises a first injection nozzle which forms the gas curtain by injecting the gas into the inside, and a gas tank feeding the gas to the first injection nozzle is provided at one side of the second housing.

3. The treated water tank in oil sand plant of claim 2, wherein the first injection nozzle is arranged in the upper side of the second housing, and the first injection nozzle comprises a first injection block which injects a first gas, and a second injection block which is formed around the first injection block and injects a second gas to the outside of the injection plane of the first gas.

4. The treated water tank in oil sand plant of claim 3, wherein the gas tank is configured with a first gas tank in which the first gas it stored, and a second gas tank in which the second gas is stored, wherein the first injection block is communicating with the first gas tank and the second injection block is communicating with the second gas tank.

5. The treated water tank in oil sand plant of claim 1, wherein the plate is provided with a plasma discharge apparatus so as to purify the treated water that is flowed in.

6. The treated water tank in oil sand plant of claim 5, further comprising a waste water outlet provided in the first space of the first housing, and at the lower position than the height of the barrier of the plate.

7. The treated water tank in oil sand plant of claim 6, further comprising a waste water line which feeds the waste water discharged from the waste water outlet to a water treatment filter of the oil sand plant.

8. The treated water tank in oil sand plant of claim 1, further comprising a second injection nozzle which is provided in the second space of the first housing and generates the gas curtain to prevent the treated water stored in the second space from being in contact with the air.

* * * * *